United States Patent [19]

Coates, Jr.

[11] Patent Number: 4,894,000

[45] Date of Patent: Jan. 16, 1990

[54] MOLDING SYSTEM

[76] Inventor: Richard C. Coates, Jr., 505 Joy La., Dundee, Ill. 60118

[21] Appl. No.: 122,385

[22] Filed: Nov. 19, 1987

[51] Int. Cl.$^4$ .................. B29C 69/00; B29C 49/04
[52] U.S. Cl. ................. 425/190; 425/378.1; 425/388; 425/449; 425/532; 425/541; 425/550; 425/591; 425/DIG. 57
[58] Field of Search .......... 249/78, 82, 102, 155, 249/158, 161; 425/2, 87, 183, 190, 195, 524, 533, 547, 550, 378.1, 388, 449, DIG. 57, 532, 541, 591, 192 R

[56] References Cited

U.S. PATENT DOCUMENTS

| | | | |
|---|---|---|---|
| 3,063,109 | 11/1962 | Rapaport | 425/DIG. 57 |
| 3,179,980 | 4/1965 | Ryan et al. | 425/DIG. 57 |
| 3,309,738 | 3/1967 | Friedman | 425/DIG. 57 |
| 3,574,897 | 4/1971 | Citron et al. | 425/DIG. 57 |
| 4,215,843 | 8/1980 | Gay et al. | 425/DIG. 57 |
| 4,299,548 | 11/1981 | Saffer et al. | 425/DIG. 57 |

Primary Examiner—James Housel
Attorney, Agent, or Firm—I. Michael Bak-Boychuk

[57] ABSTRACT

A multifunctional assembly for use in various plastic forming processes includes a housing conformed for selective partition to receive an incandescent light assembly as a source of heat and selectively positioned pneumatic cylinders for compressing heated plastic into forms and extrusion dies. An air pump selectively connected by manifolds may then be used for generating vacuum and pneumatic pressure both for the forming processes and for the pneumatic cylinders.

6 Claims, 2 Drawing Sheets

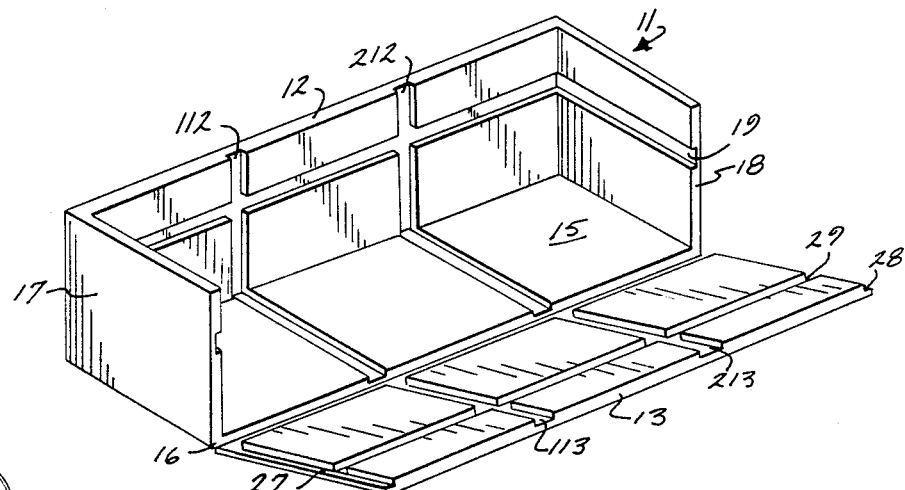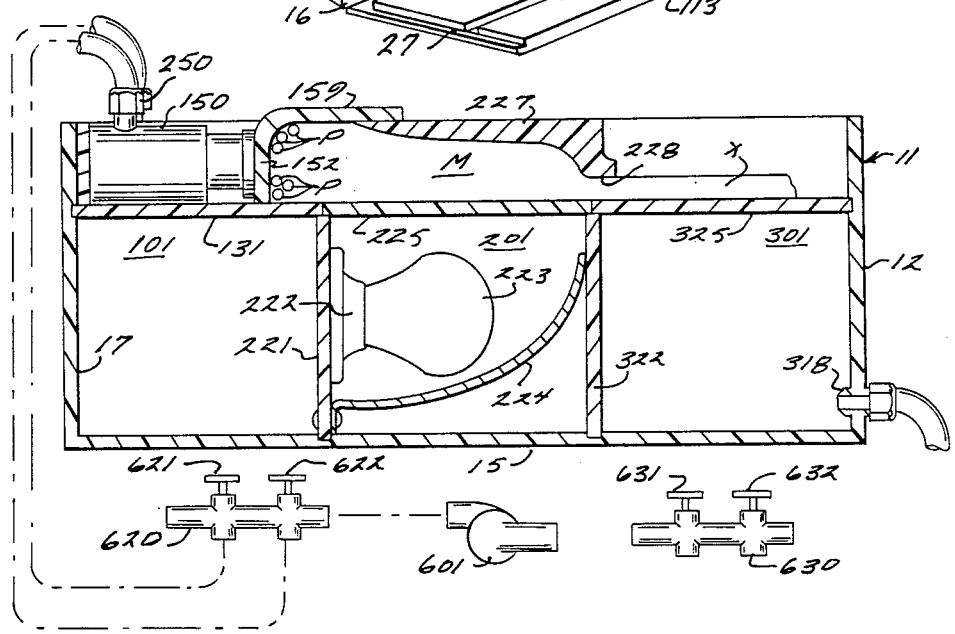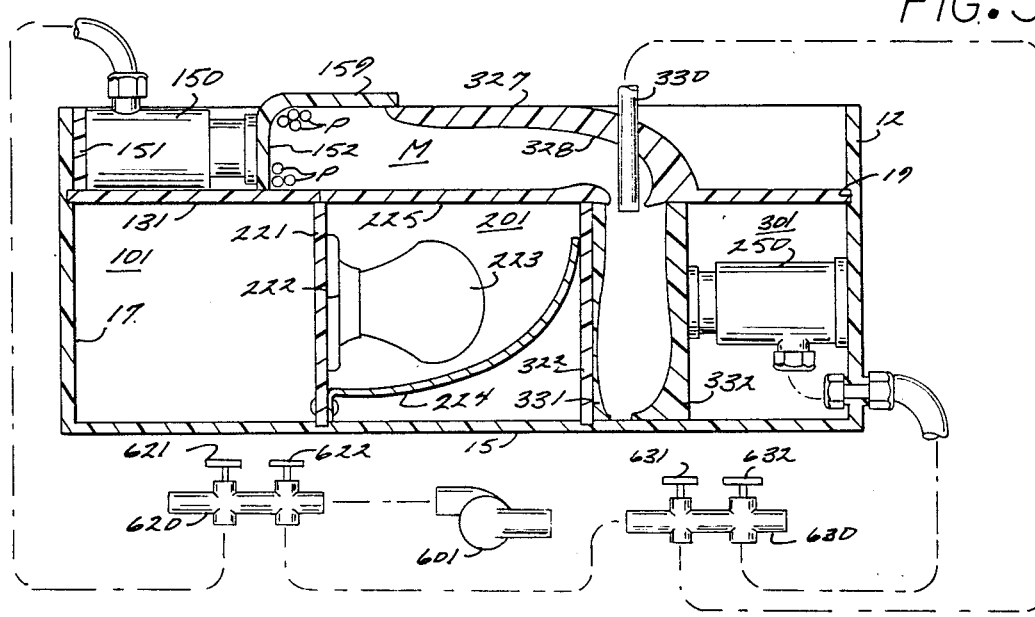

MOLDING SYSTEM

BACKGROUND OF THE INVENTION

1. Field of the Invention

The present invention relates to plastic forming devices, and more particularly to thermoplastic forming tools useful for model makers and the like.

2. Description of the Prior Art

The convenience in forming plastic articles i well known in the art. Typically, however, this convenience is best utilized in commercial settings which tolerate the expense of complex tooling with some ease. For example, the facility of an injection mold is well known as are the various casting techniques of resin polymer combinations. The tooling in these applications, typically, is spread over a large number of articles and the high cost thereof quickly falls to insignificant prorated levels.

The many new plastic polymers offer a variety of structural and visual effects. These advantages, however, are unavailable to the hobbyist or model maker simply because of tooling cost.

Accordingly, inexpensive tooling, useful in varying form is widely desired and it is one example of such tooling that is disclosed herein.

SUMMARY OF THE INVENTION

Accordingly, it is the general purpose and object of the present invention to provide a plastic article forming tool useful by a hobbyist.

Other objects of the invention are to provide a molding assembly useful in forming thermoplastic articles.

Yet further objects of the invention are to provide a plastic forming assembly useful in a variety of forming techniques.

Briefly these and other objects are accomplished within the present invention by providing a plastic forming assembly comprising a housing including three rectangular cavities each sized to a common set of dimensions to selectively receive an array of inserts and tools. Each of the cavities, moreover, is separated into an upper and a lower chamber by way of standard sized separation panels selected ones of which are useful in vacuum forming, in transmission of heat and for supporting a casting form.

A set of pneumatic cylinders is further provided for selective deployment in said chambers and an air blower is included for common application of suction or pressurized air.

In consequence the selective positioning of a heat source, like an incandescent lamp, in one of the chambers will then be useful in raising the temperature of the plastic material transferred from the adjacent chamber. The material thus heated may then be pushed by the pneumatic cylinders onto the next adjacent panel for forming into the desired shape.

In one form the insertable panel may be perforated over its surface and thus may serve as the base for vacuum forming. (Of course, by reversing the air blower the same panel may be used for casting by pressure.) Similarly, blow molding may be achieved by installing a feed closure adjacent the heated panel through which the heated plastic is forced by the pneumatic cylinder into a concentric outlet around a blow orifice. This outlet may then be directed into a split mold in the adjacent cavity which is again closed by a pneumatic cylinder. Alternatively, the heated plastic may be forced through extrusion dies or into a casting form selectively mounted in the cavities.

Thus a variety of thermoplastic forming operations are implemented in a single device by way of commonly used mechanisms which according to their placement effect the desired results.

BRIEF DESCRIPTION OF THE DRAWINGS

FIG. 1 is a perspective illustration of a housing useful with the present invention; and FIGS. 2-5 illustrate in side view the various plastic forming arrangements accommodated in the housing shown in FIG. 1.

DESCRIPTION OF THE PREFERRED EMBODIMENT

Figure 4:
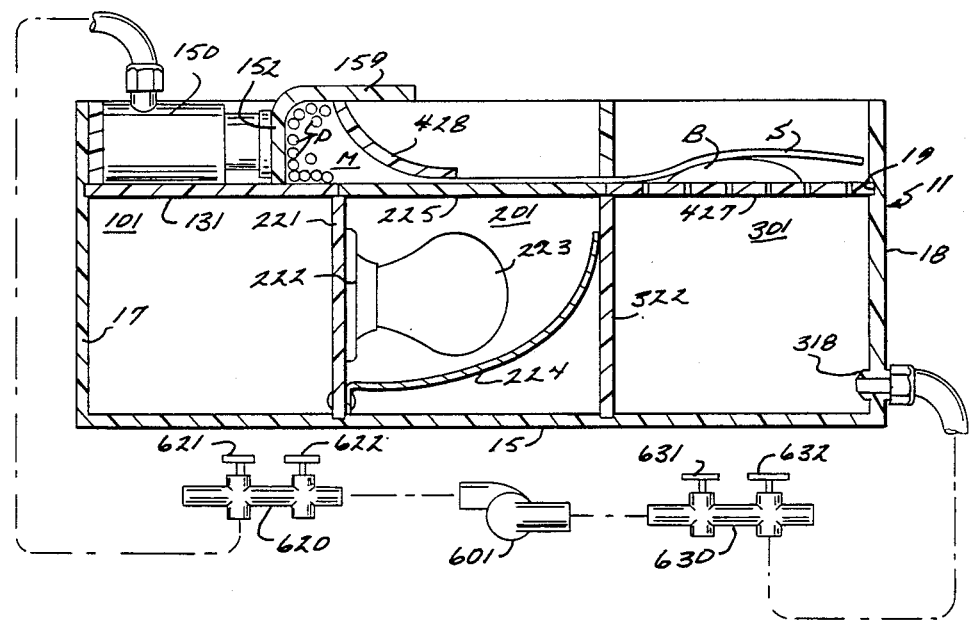

As shown in FIGS. 1-5 the inventive plastic forming assembly, comprises a hollow generally rectangular, housing 11, defined by an enclosure 12 provided with a hinged side panel 13. Preferably panel 13 is hinged to the bottom surface 15 of the enclosure 12 by way of a reduced section, flexible, hinge joint 16 and thus is air impermeable at this juncture.

Enclosure 12 and the abutting surface of panel 13, moreover, are provided further with vertical separations which cooperatively divide circle the housing 11 into three substantially equal cavities. Each of these cavities furthermore, is divided vertically into a lower chamber 101, 201 and 301 and an upper chamber by way of insertable horizontal panels described at length hereinbelow.

To effect the foregoing longitudinal sectioning of the housing 11 the interior surfaces of enclosure 12 and the hinged panel 13 include coplanar vertical grooves 112, 113, 212 and 213 spaced from each other to define the foregoing cavities between the end surfaces 17 and 18 of enclosure 12. Panel 13, furthermore, is provided with edge grooves 27 and 28 which then engage the edges of surfaces 17 and 18 when the panel is pivoted against the enclosure.

In a similar manner the upper and lower chambers are effected by a horizontal groove 19 formed transversely across the interior surface of enclosure 12 and aligned in a coplanar alignment with a groove 29 formed in the interior surface of the hinged panel 13. Thus when panel 13 is closed onto the edges of the end surfaces 17 and 18 an interior vertical alignment of grooves 112 and 113, 212 and 213 is achieved concurrent with the coplanar alignment of grooves 19 and 29.

In accordance with one implementation shown in FIG. 2 grooves 112 and 113 may then receive a vertical separation sheet 221 extending from the bottom surface 15 to the plane of grooves 19 and 29. Sheet 221 may then have affixed to one side thereof a conventional light bulb socket 222 into which incandescent bulb 223 is mounted adjacent a reflector shield 224. Preferably the alignment of the bulb and the reflector is into the central lower chamber 201 subjacent to a light transmissive panel 225 spanning across grooves 19 and 29.

In similar manner a support surface 131 may be received between grooves 19 and 29 over the lower chamber 101. A pneumatic cylinder 150 may then be positioned thereon presenting its base plate 151 against the inner side of the end surface 17. The other, extensible, end of cylinder 150 may then be engaged to a push plate 152 extending across surface 131 and once the cylinder 150 is expanded by pneumatic pressure any material collected in front of the push plate will then be advanced onto panel 225.

The material thus advanced may be in the form of thermoplastic pellets P, which when advanced onto the heated panel 225 will begin to soften and melt. Further expansion of the cylinder 150 will then transfer the molten plastic mass M to the other edge of panel 225 against a transverse dam 227 in which extrusion dies or openings 228 may be formed. Thus a variety of plastic extrusions X may be laid onto a collection surface 325 extending over the lower chamber 301 between grooves 19 and 29.

Alternatively, as shown in FIG. 3 the separator strip 227 is replaced by a blow molding fixture 327 again extending across the grooves 212 and 213 and including a shaped inlet 328 communicating into an annular opening 329 around a blow tube 330 extending into a split mold comprising a fixed mold segment 331 and a moveable mold segment 332 aligned in opposite alignment within chamber 301. Yet another pneumatic cylinder 250 may then be placed within chamber 301 to advance segment 332 against the stationary mold segment.

One will note that in this arrangement cylinders 150 and 250 are selectively placed in accordance with the use contemplated. For this reason, the cavities are maintained to substantially equal dimensions. When higher cylinder forces are required as in extrusion cylinders 150 and 250 may be used in a pair (illustrated in FIG. 2).

In a further alternative illustrated in FIG. 4 a perforated surface 427 extends over the cavity 301. Cavity 301 may be provided with a through wall fitting 318 through which air may be withdrawn. The molten matter M may then be extruded into a sheet S by way of a curved die 428 placed between grooves 112 and 113 onto the perforated surface 427 on which a buck B may be further positioned. Once surface 427 is fully covered by sheet S, air may be withdrawn from chamber 301, effecting vacuum forming.

Figure 5:
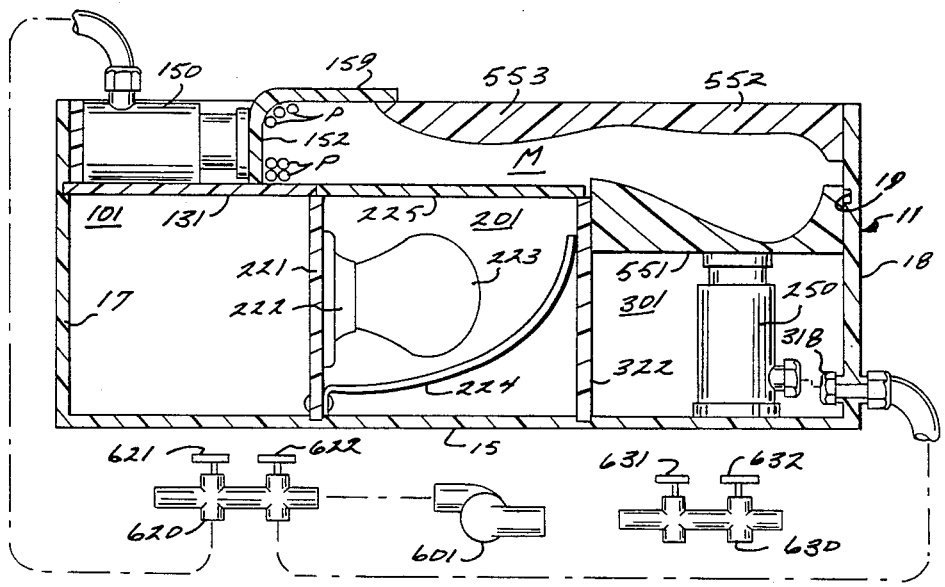

The same structural features may be further arranged for pressure casting, as illustrated in FIG. 5. As shown in this figure, cavity 301 may receive in vertical placement the pneumatic cylinder 250 onto which a moveable casting form 551 is placed. This casting form 551 is dimensioned for sliding translation within cavity 301, between the outer panel 18 and an inner separator panel 322 received between grooves 212 and 213. Upon expansion of the cylinder 250, form 551 is advanced upwardly against a stationary mating form 552 fixed in one upper chamber and extending over another upper chamber by an overhanging inlet 553 subjacent a horizontal lip 159 extending from the push plate 152.

In each of the foregoing examples, air pressure and suction are obtained at the outlet and the inlet of an air blower 601. Blower 601 is used in conjunction with two valved manifold assemblies 620 and 630 each provided with corresponding screw valves 621 and 622 and 631 and 632. These manifolds may be variously interconnected and manually sequenced for the operation devised.

Thus a convenient, multifunctional, assembly is devised for various thermoplastic operations. In each instance manual control is effected at the manifolds thus reducing the incidence of injury and burns in the course of use.

Obviously, many modifications and changes may be made to the foregoing without departing from the spirit of the invention. It is therefore intended that the scope of the invention be determined solely on the claims appended hereto.

What is claimed is:

1. An assembly useful in heating thermoplastic stock and forming plastic articles therefrom, said assembly comprising:

a substantially rectangular housing defined by a back wall, a bottom wall and a front wall pivotally attached to said bottom wall, said walls extending between a first and second end wall, said walls cooperatively combining to form a common interior cavity, the interior surfaces of said first and second end, bottom and front end walls each including a plurality of grooves aligned in a series of planes transverse to the corresponding walls;

a plurality of separator plates each defined by a peripheral edge received in aligned ones of said grooves at said peripheral edges thereof;

heating means attached to a selected one of said separator plates;

an air pump including an air inlet and an air outlet;

a plurality of air cylinders inserted in said interior cavity adjacent said first end wall;

manifold means for selectively connecting said outlet of said air pump to said air cylinders;

suctions means selectively connected to said inlet of said air pump and deployed to produce suction in a selected portion of said cavity between said second end wall and the adjacent one of said separator plates; and forming means received in said grooves and aligned to receive said thermoplastic stock to form said articles therefrom.

2. Apparatus according to claim 1 wherein said forming means includes:

an extrusion form engaged in said grooves and aligned adjacent said cylinders and said heating means.

3. Apparatus according to claim 1 wherein said forming means includes:

a vacuum forming assembly engaged in said grooves and including a perforated surface enclosing a portion of said cavity adjacent said second wall operatively connected to said input of said air pump.

4. An article forming assembly for thermoplastic forming a plastic matter comprising:

a housing having a plurality of adjacent enclosures;

heating means inserted into a first one of said enclosures;

a first pneumatic cylinder in a second one of said enclosures;

said first and second enclosures including a common surface extending across said first and second enclosures whereby said pneumatic cylinder is extended to translate said plastic matter over said common surface onto said heating means;

a mold means for receiving heated plastic matter pushed by the first cylinder and for forming plastic articles; and a second pneumatic cylinder received in said housing and connected to articulate said mold upon receiving said plastic matter from said heating means.

5. Apparatus according to claim 4 further comprising:

a source of pneumatic pressure; and controllable manifold means connected between said source and said first and second pneumatic cylinder for selective articulation thereof.

6. Apparatus according to claim 5 wherein:

said heating means includes an incandescent electrical light.

* * * * *